United States Patent
Cox

(10) Patent No.: US 8,457,799 B2
(45) Date of Patent: Jun. 4, 2013

(54) AUTOMATIC GATED PIPE ACTUATOR

(75) Inventor: Charles Kelly Cox, Delta, CO (US)

(73) Assignee: Fine Line Industries, Inc., Delta, CO (US)

( * ) Notice: Subject to any disclaimer, the term of this patent is extended or adjusted under 35 U.S.C. 154(b) by 254 days.

(21) Appl. No.: 12/624,216

(22) Filed: Nov. 23, 2009

(65) Prior Publication Data

US 2010/0129154 A1    May 27, 2010

Related U.S. Application Data

(60) Provisional application No. 61/199,892, filed on Nov. 21, 2008.

(51) Int. Cl.
*A01G 27/00* (2006.01)
(52) U.S. Cl.
USPC .............................. 700/284; 239/69
(58) Field of Classification Search
USPC .......... 700/284; 239/63, 64, 69, 70; 137/78.2, 137/78.3; 405/39
See application file for complete search history.

(56) References Cited

U.S. PATENT DOCUMENTS

| | | | |
|---|---|---|---|
| 3,327,990 A | 6/1967 | Hohnstein | |
| 3,794,294 A | 2/1974 | Sherman | |
| 3,842,859 A | 10/1974 | Reinke | |
| 3,880,189 A | 4/1975 | Bennett | |
| 3,953,978 A | 5/1976 | Soileau | |
| 4,267,972 A | 5/1981 | Bryant | |
| RE31,023 E | 9/1982 | Hall, III | |
| 4,407,453 A | 10/1983 | McClellen | |
| 4,498,809 A | 2/1985 | Farmer | |
| 4,543,990 A | 10/1985 | Meuleman | |
| 4,577,802 A | 3/1986 | Keller et al. | |
| 4,611,617 A * | 9/1986 | Hewitt ........................ 137/68.16 |
| 4,673,128 A | 6/1987 | Keller et al. | |
| 4,810,897 A * | 3/1989 | Shotey ......................... 307/112 |
| 4,852,802 A | 8/1989 | Iggulden et al. | |
| 5,002,428 A | 3/1991 | Shettel | |
| 5,110,086 A | 5/1992 | Meuleman | |
| 5,176,163 A | 1/1993 | Al-Hamlan | |

(Continued)

FOREIGN PATENT DOCUMENTS

| | | |
|---|---|---|
| JP | 2047415 A | 2/1990 |
| JP | 2003-333945 A | 11/2003 |

OTHER PUBLICATIONS

Bafsco, B.A. Fischer Sales Co., Inc., Gated Pipe Accessories List, Jan. 1, 2009, pp. 1-4, Boise, Idaho.

(Continued)

*Primary Examiner* — Charles Kasenge
(74) *Attorney, Agent, or Firm* — Patterson Thuente Pedersen, P.A.

(57) ABSTRACT

An automatic gated-pipe actuator for controlling flow of an irrigation material to an agricultural region through an irrigation gate in a gated-irrigation pipe. The automatic gated-pipe actuator includes a gate valve for coupling to the gated-irrigation pipe, a gate actuator removably coupled to the gate valve and for actuating the gate valve and an automatic gated pipe gate control unit for controlling actuation of the gate valve. The control unit has a processor unit communicatively coupled to the gate actuator. Upon instruction from the gate control unit, the gate actuator will actuate and alter the disposition of the gate valve thereby altering the flow of irrigation material through the irrigation gate and to a portion of the agricultural region adjacent the irrigation gate.

21 Claims, 12 Drawing Sheets

U.S. PATENT DOCUMENTS

| | | | |
|---|---|---|---|
| 5,213,303 A * | 5/1993 | Walker | 251/30.02 |
| 5,333,785 A * | 8/1994 | Dodds et al. | 239/69 |
| 5,342,144 A | 8/1994 | McCarthy | |
| 5,577,863 A | 11/1996 | Nottle | |
| 5,878,955 A * | 3/1999 | Al-Hamlan | 239/66 |
| 5,984,575 A | 11/1999 | Knott, Sr. | |
| 5,993,111 A | 11/1999 | Holloway, Jr. | |
| 6,171,023 B1 | 1/2001 | Townshend | |
| 6,220,293 B1 * | 4/2001 | Rashidi | 137/624.18 |
| 6,283,139 B1 * | 9/2001 | Symonds et al. | 137/78.3 |
| 6,782,310 B2 | 8/2004 | Bailey et al. | |
| 6,786,234 B2 | 9/2004 | Schafer et al. | |
| 6,932,277 B1 * | 8/2005 | Ericksen et al. | 239/1 |
| 7,063,270 B2 * | 6/2006 | Bowers et al. | 239/69 |
| 7,114,878 B2 | 10/2006 | Craig et al. | |
| 7,165,730 B2 | 1/2007 | Clark et al. | |
| 7,201,180 B2 * | 4/2007 | Ephrat et al. | 137/14 |
| 7,203,576 B1 * | 4/2007 | Wilson et al. | 700/284 |
| 7,264,177 B2 * | 9/2007 | Buck et al. | 239/63 |
| 7,280,892 B2 * | 10/2007 | Bavel | 700/284 |
| 7,286,904 B2 * | 10/2007 | Graham | 700/284 |
| 7,359,769 B2 | 4/2008 | Bailey et al. | |
| 7,383,721 B2 * | 6/2008 | Parsons et al. | 73/46 |
| 7,406,363 B2 * | 7/2008 | Doering et al. | 700/284 |
| 7,469,707 B2 * | 12/2008 | Anderson et al. | 137/78.3 |
| 7,822,511 B2 * | 10/2010 | Ivans | 700/284 |
| 8,074,897 B2 * | 12/2011 | Hunnicutt et al. | 239/222.17 |
| 2006/0043208 A1 * | 3/2006 | Graham | 239/70 |
| 2008/0039978 A1 * | 2/2008 | Graham | 700/284 |

OTHER PUBLICATIONS

Yonts et al., "Surge Irrigation Field Layouts", *NebGuide*, Jul. 2001, 2 pages, University of Nebraska—Lincoln.

PCT International Preliminary Search Report on Patentability dated May 24, 2011, for PCT Application No. PCT/US2009/065574, filed Nov. 23, 2009, 3 pages.

PCT Application No. PCT/US2009/065574 filed Jul. 9, 2010, PCT Search Report dated Jul. 9, 2010, 8 pages.

* cited by examiner

AUTOMATIC GATED PIPE ACTUATOR

RELATED APPLICATIONS

The present application claims the benefit of U.S. Provisional Application No. 61/199,892, filed Nov. 21, 2008, which is incorporated herein in its entirety by reference.

FIELD OF THE INVENTION

This invention relates generally to methods and system of irrigation and more particularly, to methods and systems of irrigation using gated pipes and automatic gate control actuators.

BACKGROUND OF THE INVENTION

The production of food and goods through farming or agriculture has been central to the rise and maintenance of the world's population. Throughout history, key developments in the agriculture industry allowed for the stabilization of the food supply, thereby allowing the development of more densely populated areas such as cities and towns. More recently, agriculture has taken a larger role in providing energy in the form of, for example, corn ethanol and soybean ethanol. Thus agriculture, while historically important for supplying edible goods for consumption by humans and livestock, is now proving to be of greater importance by providing both edible goods and alternatives to fossil fuels.

The development of irrigation systems is just one of many advancements that have greatly altered the agriculture industry. One of the earliest forms of irrigation was to dig a water channel or row to direct the flow of water to the various crops in a field. Other early forms of irrigation included vertical wells and gently sloping tunnels, underground canals and a series of water-wheels. Today there are several different forms of irrigation which can be broadly categorized as surface irrigation, drip irrigation, sprinkler irrigation and center-pivot irrigation. Surface irrigation uses gravity to move water across the land, and can be characterized by the use of furrows, border strips or basins. Drip irrigation functions to deliver water near the root zone of plants and sprinkler and center-pivot irrigation systems utilize sprinkler heads in fixed positions or on wheeled bases or wheeled towers to supply water to plants.

However, all of these methods of irrigation have several disadvantages in their use. For example, sprinkler and center-pivot irrigation systems utilize a series of sprinkler heads to provide water. These sprinkler systems place a stream of water into the air which then will fall onto the plants. This is a very inefficient method of irrigation as a portion of the water evaporates into the air before settling on the surfaces of the plants or being absorbed into the soil. Further, the sprinkler heads that provide the water are often highly complex, are expensive and require continual maintenance to keep in operating form. For instance, the sprinkler heads may require a full deconstruction in order to clean the parts due to various minerals in the water. Further, these systems require a mounting system and are often large and complex mobile systems that allow for the sprinklers to move across the land needing irrigation. Finally, the sprinkler and center-pivot systems apply water to large areas at once and thus are not able to apply water to specific plants.

Drip irrigation systems also have their own disadvantages. Specifically, drip systems are expensive to install especially the systems that are installed underground close to the roots. These drip systems require a significant outlay in capital to trench the fields and lay the water-providing drip hoses. In other direct-drip applications, the costs are still high due to the costs of the extensive drip-hose and nozzle network. Further, the drip irrigation systems also require a significant amount of maintenance because the drop nozzles are prone to clogging from various impurities in the water. A related disadvantage is that drip systems almost always require the use of a filter or series of filters to reduce the number of clogging impurities in the water. In addition, drip irrigation systems are often the most complex systems due to the direct nature of the irrigation. Each drip system may have thousands of drip valves that need to be monitored and maintained as well as an extensive hose system that needs constant maintenance and repair. Finally, similar to the sprinkler systems described above, drip irrigation is not able to regulate the water supply to individual plants or groups of plants without running independent drip irrigation lines to the individual plants or adding several junctions or inline valves to the system.

The various methods of surface irrigation such as basin, bay and furrow irrigation also have similar disadvantages in their application. For instance, basin irrigation often requires a land area to be filled with water, which will then permeate the ground and possibly drain into an adjacent property. This is inefficient in that much of the water will evaporate before being absorbed by the plants. Further, basin irrigation efficiency requires significant research into the soil composition in relation to the crops as water that doesn't drain effectively can have significant detrimental effects on the crop thus greatly reducing yields. As such, basin irrigation is often utilized by farmers who are growing crops that need a significant amount of water and don't require any regulation of water supply beyond "flooding".

Furrow irrigation often utilizes several small channels in the field along with the gravitational pull created by a slope to move the water down the channel to the plants. Thus, basic furrow irrigation may be cost effective but it requires a significant amount of water flow planning because the amount of water provided is reduced as you move from the source. Further, furrow irrigation is not able to target a specific plant or a series of plants and instead is applied to a larger area of land as in many of the other irrigation methods outlined above. Recent developments in furrow irrigation have brought the use of various pipe systems to allow for a more efficient flow of water and to overcome some of the issues with water distribution. These include a gated pipe system that utilizes sliding gate valves in order to alter the flow of water from the water source. However, these gated valves require that a person, often a farmer or farm-hand, walk through the fields with a gated-pipe valve opener and manually open and close all gates. In other recent implementations, a series of pneumatic pipes is affixed to the gated pipe and sliding gate valves and pressurized air is used to open and close the gates. However, these pneumatic gate control systems require a complex and extensive run of air hoses to be placed throughout the field and do not allow the independent control of each gate in the gated pipe. Further, various portions of the pneumatic system suffer from air pressure drops thus leading to operation inefficiency in that gates will not function unless you maintain a constant air pressure across all gates. Finally, these pneumatic systems are all interconnected, thus if there is a break in the hose providing the pressure to open or close the gate, the whole system will become inoperable. A break would thus require the manual checking of the entire length of hose to determine the location of break and to restore operation to the sliding valves. Thus, even with the advances in gated pipe technology, there are still large inefficiencies in the furrow method of irrigation in order to obtain the optimal water flow for various areas of land.

Given the various disadvantages outlined above, a need exists for an automatic gated-pipe actuator that is self contained, cost-effective and provides independent, automatic gate control, and infinitely-variable water flow.

SUMMARY OF THE INVENTION

Various embodiments of the invention are able to adjust the flow of water through gated irrigation pipes with increased efficiency and control while reducing water use and increasing yields. One embodiment including a gated-pipe actuator having a base plate that is affixed to a gated irrigation pipe, a weather resistant automatic gated-pipe actuator case affixed to the base plate, a gate control unit disposed within the case, a sliding gate valve and a gate actuator operably coupled to the gate and to the gate valve. The gate actuator will open or close the sliding gate valve based on instructions from the gate control unit.

Another embodiment the automatic gated-pipe actuator is able to open or close, or otherwise control more than one sliding gate valve by utilizing mechanical attachments, such as gate rods. In various embodiments the gate rods are operably coupled to the gate actuator thereby allowing multiple-valve control.

In various embodiments, the automatic gated-pipe actuator utilizes a microprocessor control, a memory coupled to the microprocessor controller, a timer module coupled to the microprocessor, a power module couple to the microprocessor, a power charging unit coupled to the microprocessor, a manual override switch operably coupled the microprocessor controller; a program switch operably coupled the microprocessor controller, a communications port operably coupled to the microprocessor controller, a motor controller operably coupled to the microprocessor controller and a motor assembly, a motor operably coupled to the motor controller whereby the microprocessor is adapted to instruct the motor assembly to actuate the motor based on a set of instructions. In at least one embodiment, the communications port coupled to the microprocessor is able to accept input from a variety of sources including pushbutton switches, rotary switches, wireless antennas, handheld programming devices, and digital memory devices. In other embodiments, the invention accepts input from sources such as a USB memory stick or a memory card. In certain embodiments the power storage unit is a battery or capacitor, thereby providing the automatic gated-pipe actuator a power source. In various embodiments the power charging unit is a solar panel. In other embodiments the power charging unit may be an interface that is capable of providing an electric charge such as the USB interface. Thus, in certain embodiments the communications port may also contain the power charging unit.

In various embodiments the sliding gate valve has a screw or other mechanical interface affixed thereupon for connecting or coupling to the gate actuator. In various embodiments the gate actuator is a screw actuator shaft that is coupled to the screw of the sliding gate valve. The screw actuator shaft will rotate and thereby change the position of the sliding gate valve between an open and closed position.

In certain embodiments, the automatic gated-pipe actuator includes a second sliding gate valve and a second gate actuator connecting the gate control unit to a second gate valve wherein the second actuator will open or close the second sliding valve. In a related embodiment, the automatic gated-pipe actuator includes a microprocessor controller, a memory operably coupled the microprocessor controller, a timer module operably coupled the microprocessor controller, a power storage unit operably coupled the microprocessor controller, a power charging unit operably coupled the microprocessor controller, a manual override switch operably coupled the microprocessor controller, a communications port operably coupled the microprocessor controller, a first motor operably coupled the microprocessor controller, and a second motor operably coupled to the microprocessor controller whereby the microprocessor controller is adapted to instruct the first motor and second motor to actuate in response to a set of instructions.

DETAILED DESCRIPTION OF THE DRAWINGS

The embodiments of the invention will be detailed in the following description in accordance with the drawings.

Figure 1:
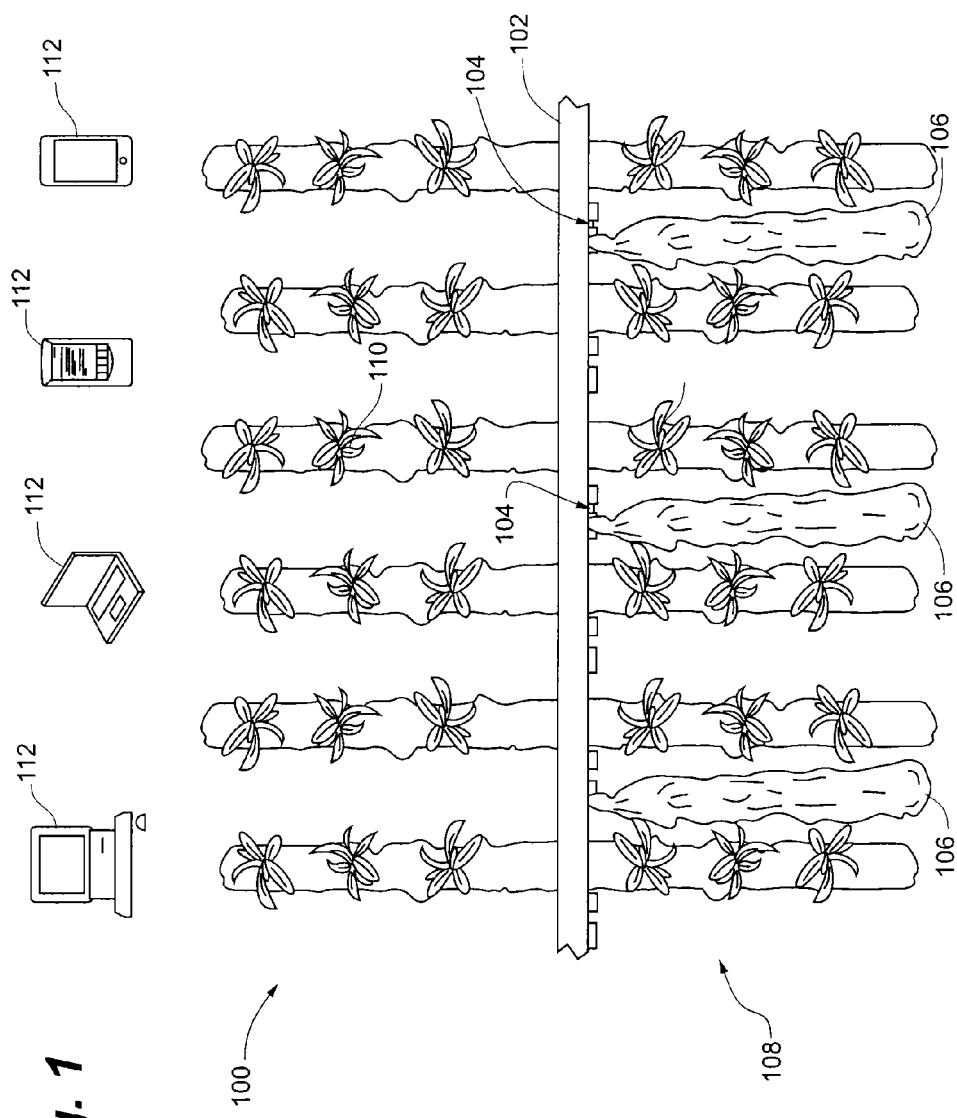
FIG. 1 is an over schematic of a system of irrigation utilizing an automatic gated-pipe actuator.

Referring to FIG. 1, a high-level view of a system of irrigation utilizing automatic gated-pipe actuators is described. In one embodiment, the irrigation system 100 includes a gated pipe 102, automatic gated-pipe actuator (AGPA) 104, and an agriculture supporting field 106. The gated pipes 102 and automatic gated-pipe actuators 104 combine to enable and control the flow of irrigation material 108 to the field 106. Specifically, in various embodiments, the gated pipe 102 carries the irrigation material 108 to the field 106 and AGPA 104 move from an open to a closed position allowing the irrigation material 108 to flow from the pipe 102, thereby providing the material 108 to the field 106. The field 106 may contain a plurality of plants 110 which utilize the irrigation material 108 in growth and development. In various embodiments, the plants 110 may be for human consumption such as corn and wheat, or may be utilized for both human and animal consumption, product development and energy such as Soybean. However, one having skill in the art will recognize that the system 100 can be utilized to provide irrigation material 108 to any plant 110 regardless of the intended use.

In various embodiments, the gated pipes 102 are strategically placed in the field 106 in order to enable a more even and efficient application and flow of irrigation material 108. In certain embodiments, the field 106 may be aligned into several growing rows with irrigation "ditches" or channels placed between them. In these embodiments, the gated pipe 102 may be placed perpendicular to the growing rows and the AGPA 104 are aligned with the irrigation channels in order to allow the irrigation material 108 to flow into the channels when the AGPA 104 are aligned in the open position. A person having skill in the art will recognize that the system 100 can be utilized to carry irrigation material 108 to fields 106 that are arranged in other configurations. For example, the gated pipes 102 pay be placed parallel to the plants, thereby allowing more of a direct application of irrigation material 108.

The irrigation material 108 may include water, fertilizer, and nitrogen. In other embodiments, the system 100 may deliver pesticides or other protective agents to the plants 110. Therefore, a person having skill in the art will recognize that the system 100 can be utilized to carry any irrigation material 108 that is able to efficiently flow through the gated pipe 102 and AGPA 104, thereby creating an effective method of distributing material to the field 106.

In various embodiments, the system 100 includes a remote control device 112 which is capable of controlling the AGPA 104 and thereby altering the flow of irrigation material 108 to the plants 110. In various embodiments, the remote control device 112 may be a Personal Data Assistant (PDA), laptop computer, desktop computer, smartphone, communications server or other device capable of sending and receiving a controlling signal or other data communication, wired or wirelessly to the AGPA 104. The remote control device 112 may utilize various wired and wireless communication protocols such as 802.3, 802.3ab/ah, 802.11a/b/g/n, Bluetooth, coded orthogonal frequency-division multiplexing (COFDM), Media Transfer Protocol (MTP) or other protocols capable of supporting communication over a wired or wireless interface. Further, in various embodiments, the remote control device 112 may utilize multi-tiered computer architecture or additional network-enabled services in order to send a control signal or other data communication to the AGPA 104. In this way, the AGPA 104 of the system 100 are capable of receiving communications from a wired or wireless remote control device 112 and thereby may adjust the flow of irrigation material 108 to the field 106.

Figure 2A:
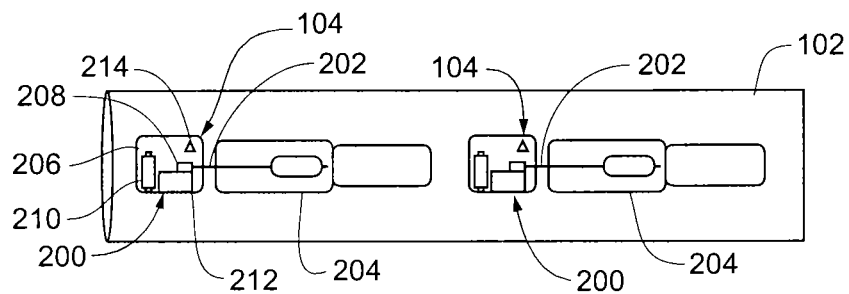
FIGS. 2A-2C are schematic diagrams depicting an automatic gated-pipe actuator controlling one gate valve according to various embodiments.
Figure 2B:
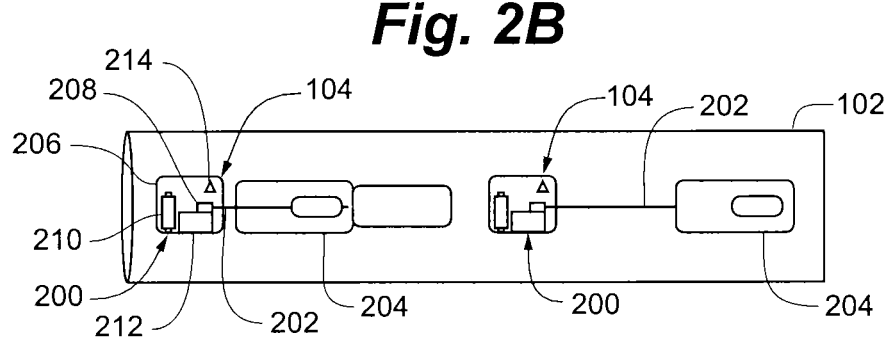
Figure 2C:
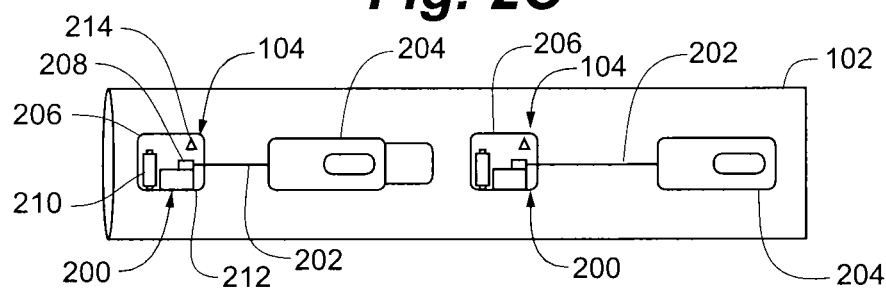

Referring to FIGS. 2A-2C, an AGPA 104 according to one embodiment is depicted. The AGPA 104 may have an automatic gate controller 200, a gate actuator 202 and a gate valve 204. In various embodiments, the gate actuator 202 is connected to the gate controller 200 and gate valve 204. Thus, in operation, the gate controller 200 causes the gate actuator 202 to actuate, thereby moving the gate valve 204. The gate actuator may actuate in an infinitely variable range of 0-100% and thus allows for complete control of the gate valve 204, thereby allowing for finite control of the gate openings in the gated pipe 102. The gate controller 200 may be disposed within a weather resistant case 206 in order to protect it from the environment. In various embodiments, the gate controller 200 may contain a motor 208, power storage unit 210, a power charging unit 212 and a communications port 214. The motor 208 may be a DC motor capable of forward and reverse motion. The power storage unit 210 may be a rechargeable battery, capacitor or other device capable of storing power for later use. The power charging unit 212 may be a solar panel, USB charging circuit or other unit capable of recharging the power storage unit 210. The communications port 214 may be a USB 1.0/2.0/3.0 port, an antenna, a memory card slot such as Secure Digital (SD) or Compact Flash (CF), a serial port or other port type capable of sending and receiving control signals or other data communications. The gate valve 204 may be may be a rotary valve, butterfly valve, sliding plate, pivoting plate, or other such valve that allows for variable open or closed positions. Further, as depicted in FIGS. 2A-2C each AGPA 104 operates independently, thereby allowing finite control of each gate in a gated pipe 102. For example, FIG. 2A depicts two AGPA 104 having gate valves 204 in the open position while FIG. 2B depicts two AGPA 104, one having a gate valve 204 in the open position and the other having a gate valve 204 in a closed position. FIG. 2C depicts the infinitely variable capability of the AGPA 104 and depicts two AGPA 104, one having a gate valve 204 in a closed position and the other having a gate valve 204 in the 50% open position. A person having skill in the art will realize that the gate valve 204 configurations depicted in FIGS. 2A-2C are just a few examples of gate valve 204 configurations allowed by the AGPA 104.

Figure 3:
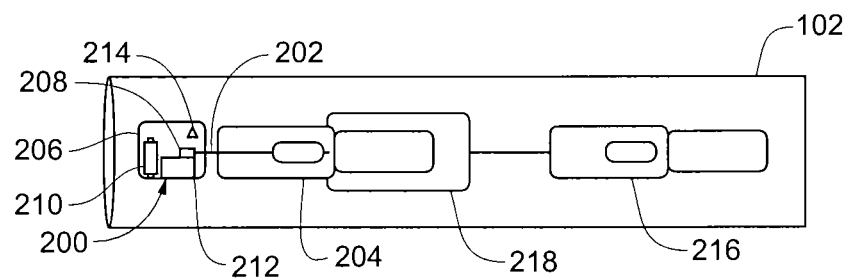
FIG. 3 is schematic diagram depicting the automatic gated-pipe actuator controlling two gate valves according to one embodiment.
Figure 4A:
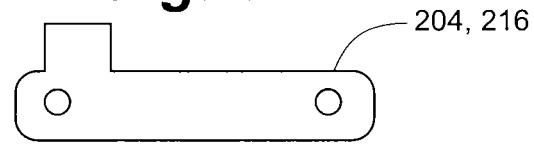
FIGS. 4A-4B are schematic diagrams depicting an automatic gated-pipe actuator gate valve according to various embodiments.
Figure 4B:
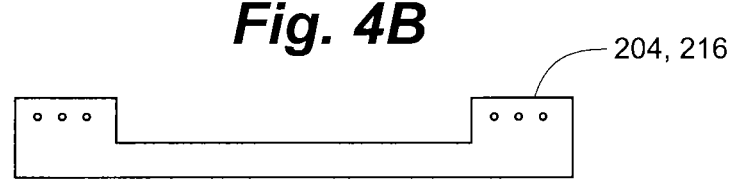

FIG. 3 depicts a single AGPA 104 controlling multiple gates in a gated pipe 102 according to one embodiment. In this embodiment, the AGPA 104 has an automatic gate controller 200, a gate actuator 202 and a first gate valve 204, a second gate valve 216 and an interconnecting unit 218. The first gate valve 206 and second gate valve 216 may be configured to operably attach to an interconnecting unit 218 thereby connecting the first gate valve 204 and second gate valve 216. For example, in one embodiment, the interconnecting unit 218 may be a rigid wire and the first gate valve 204 and second gate valve 216 may have circular openings thereupon allowing the rigid wire to operably attach, enabling the first gate valve and second gate valve to move in unison. Various embodiments of a first and second gate valve 204, 216 adapted to be used with an interconnecting unit 218 are shown in FIGS. 4A and 4B. The interconnecting unit 218 is configured so as not to affect the flow of irrigation material 108 through the first gate opening of the gated pipe 102 controlled by the first gate valve 206 thereby ensuring that irrigation material 108 will be delivered without disruption. Thus, in various embodiments, the AGPA 104 is able to control the flow of irrigation material 108 through more than one gate in a gated pipe 102.

Figure 5:
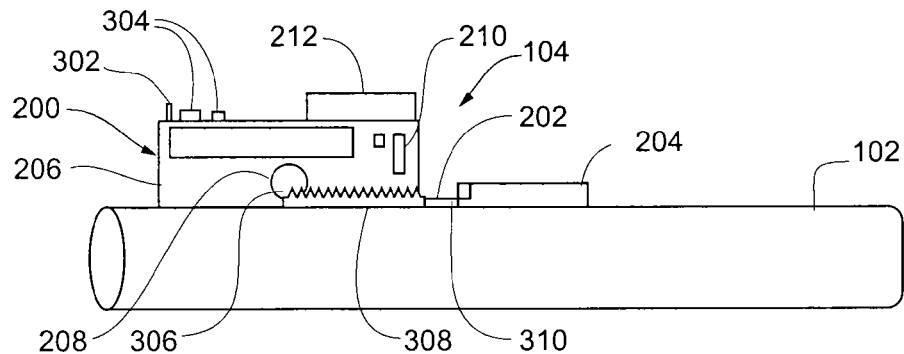
FIG. 5 is a schematic diagram of an automatic gated-pipe actuator according to another embodiment.
Figure 6:
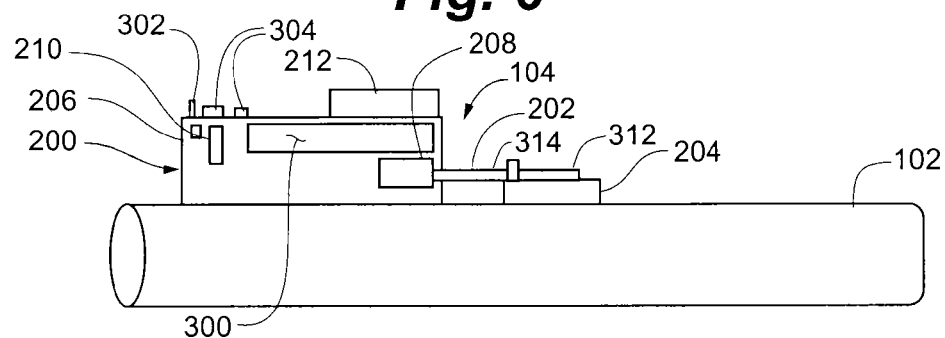
FIG. 6 is a schematic diagram of an automatic gated-pipe actuator according to another embodiment.
Figure 7:
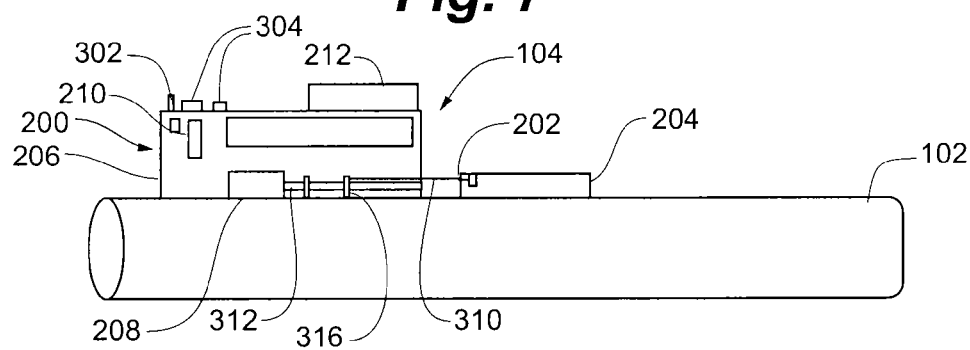
FIG. 7 is a schematic diagram of an automatic gated-pipe actuator according to another embodiment.
Figure 8:
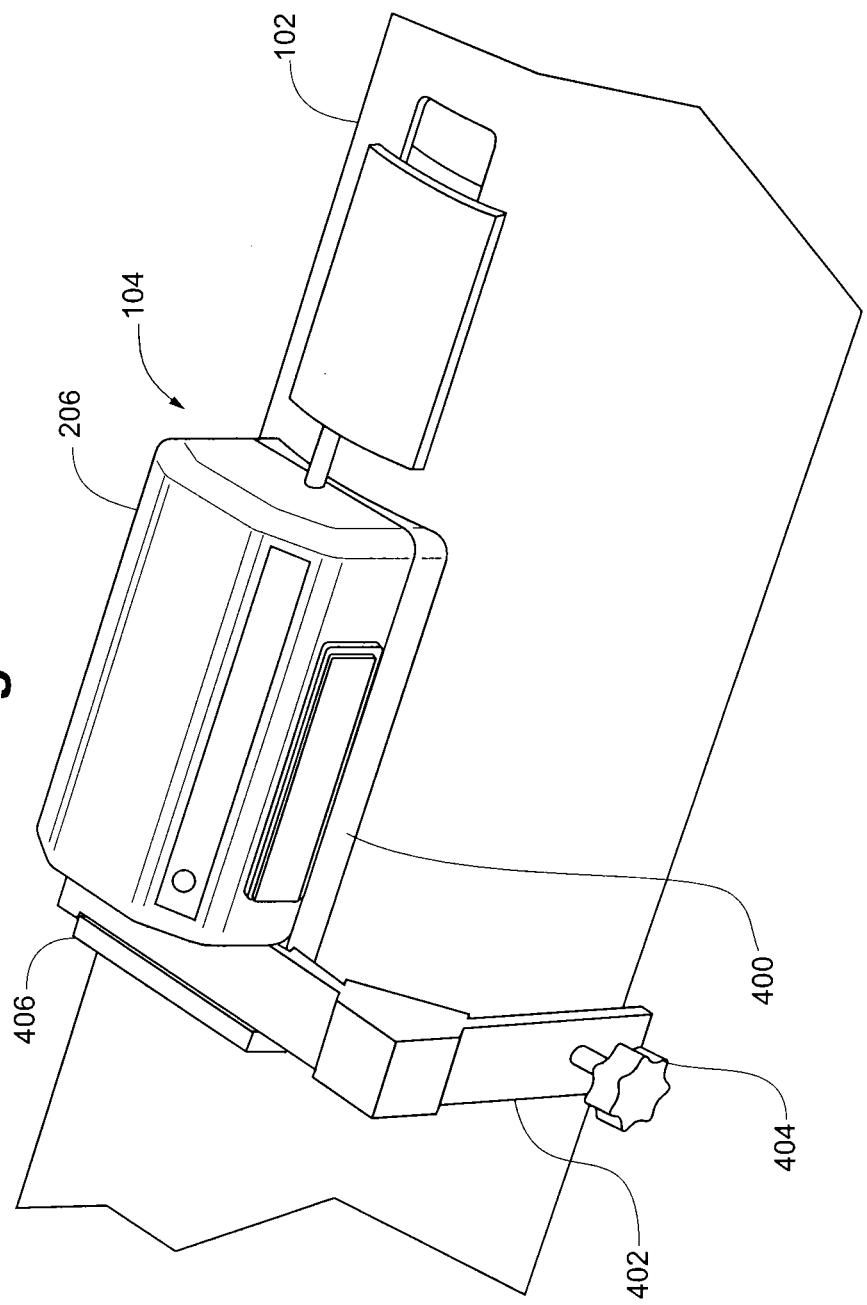
FIG. 8 is a schematic diagram of an automatic gated-pipe actuator according to another embodiment.
Figure 9:
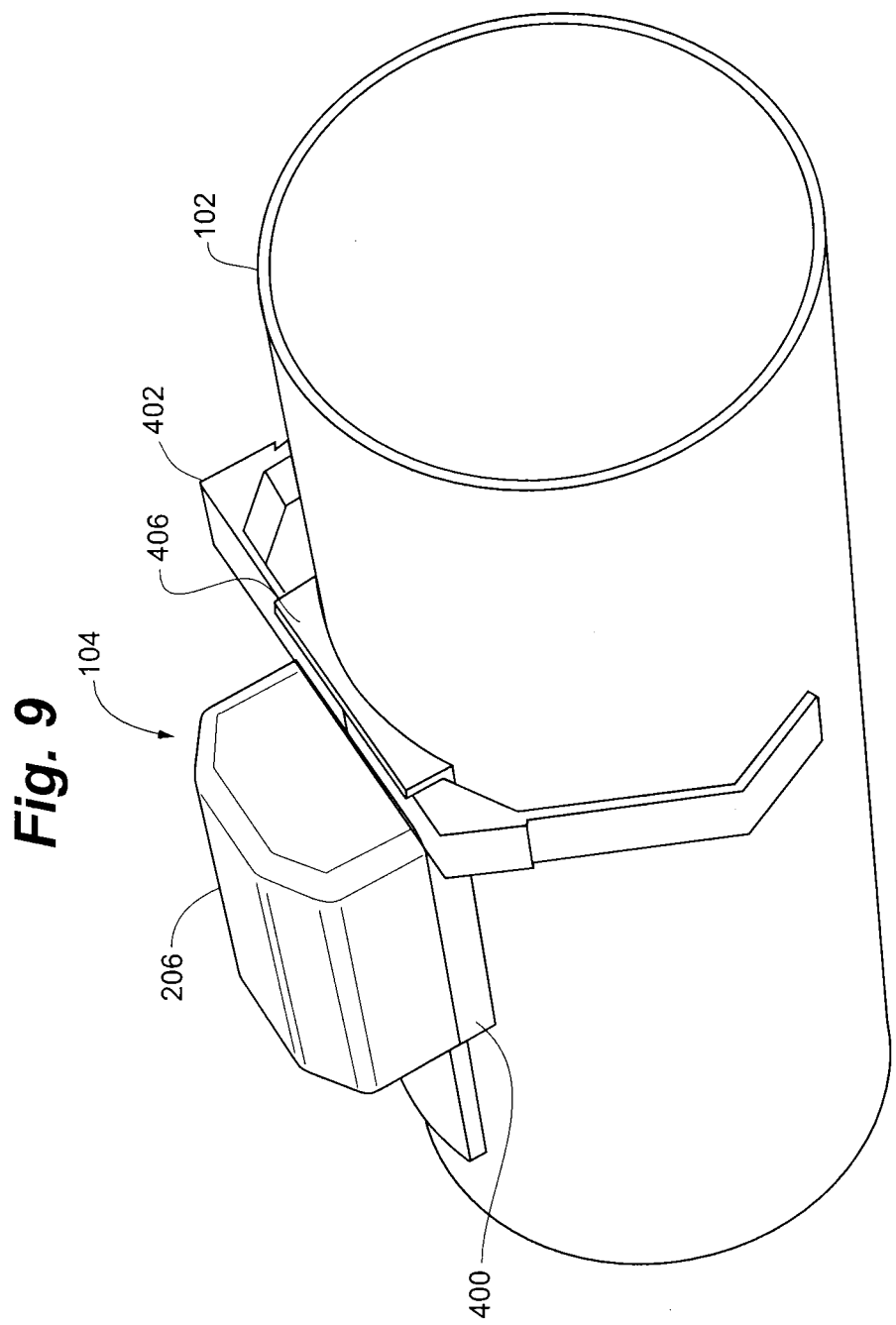
FIG. 9 is a schematic diagram of an automatic gated-pipe actuator according to another embodiment.

Referring to FIGS. 5-7, various embodiments of an AGPA 104 are depicted. The various embodiments of FIGS. 5-7 depict an AGPA 104 having an automatic gate controller 200, gate actuator 202, gate valve 204, weather-resistant case 206, motor 208, power storage unit 210 and power charging unit 212. In addition, the embodiments of FIGS. 5-7 depict a timer and controller module 300, manual override switch 302 and a plurality of programming switches 304. The timer and controller module 300 may be operably connected to the motor 208 and power storage unit 210. In various embodiments, the timer and controller module 300 are an integrated circuit such as a microprocessor, microcontroller or field programmable gate array (FPGA). Thus, the timer and controller module 300 may be programmed with instructions or program logic to control the operation of the motor 208 and cause the gate actuator 202 to actuate, thus altering the position of the gate valve 204. For example, the timer and controller module 300 may provide instructions to the motor 208 to run in a rotationally clockwise rotation for 30 seconds, thereby causing the actuator 202 to actuate and open the gate valve 204. The manual override switch 302 may be used to manually override and interrupt the operation of the timer and controller module 300 and instruct the motor 208 and gate actuator 202 to open or close the gate valve 204. The programming switches 302 allow for a user to alter the program logic of the timer and controller module 300 thus altering the operation of the AGPA 104.

The AGPA 104 may utilize various different configurations of the motor 208 and gate actuator 202 to enable reliable and consistent function. For example, FIG. 5 depicts one embodiment wherein the motor 208 utilizes a gear attachment 306 and the gate actuator 202 utilizes a sliding rack 308 attached to a gate rod 310, which is affixed to the gate valve 202 in order to open and close the gate valve 202.

FIG. 6 depicts an embodiment wherein the gate actuator utilizes a threaded shaft 312 engaged with a threaded port 314 affixed to the gate valve 202. In this embodiment, the motor 208 will rotate the threaded shaft 312 thereby opening or closing the gate valve 202.

FIG. 7 depicts an embodiment wherein the gate actuator utilizes a threaded shaft 312 engaged with a threaded collar 316 affixed to a gate rod 310, which is affixed to the gate valve 202. A person having skill in the art will appreciate that various other configurations of the motor 208, gate actuator 202 and gate valve 204 are possible and not confined to the embodiments depicted in FIGS. 5-7. Further, a person having skill in the art will recognize that while FIGS. 5-7 depict embodiments that utilize a AGPA 104 having a gate actuator 202 controlling a single gate valve 204, in various other embodiments the AGPA 104 may utilize a gate actuator 202 that controls a plurality of gate valves 204 that are converted together using, for example, a gate rod 310.

Referring to FIGS. 8-13, additional embodiments of the AGPA 104 are depicted. In one embodiment depicted in FIGS. 8-9, the AGPA 104 includes a bracket base plate 400, an adjustable bracket 402 and a threaded adjuster 404 to interface with the gated pipe 102. The bracket base plate 400 may interface with the weatherproof case 206 in a releasable configuration thereby allowing the bracket base plate 400 and weatherproof case 206 to be removed for servicing and storage. The bracket base plate 400 may be partially circular on the edge facing the gated pipe 102 in order to allow the bracket base plate 400 to conform to the curvature of the gated pipe 102. Further, the base plate 400 may have an adjustable bracket interface portion 406 that allows the adjustable bracket 402 to interface with the bracket base plate 400 in a releasable configuration thereby allowing additional placing options and maintenance. The adjustable bracket 402 may be substantially circular in order to interface with the gated pipe 102. The threaded adjuster 404 may interface with complimentary threads on the adjustable bracket 402 and protrude through the adjustable bracket 402 to interface with the gated pipe 102 thereby securing the bracket base plate 400 and adjustable bracket 402 to the gated pipe 102.

Figure 10:
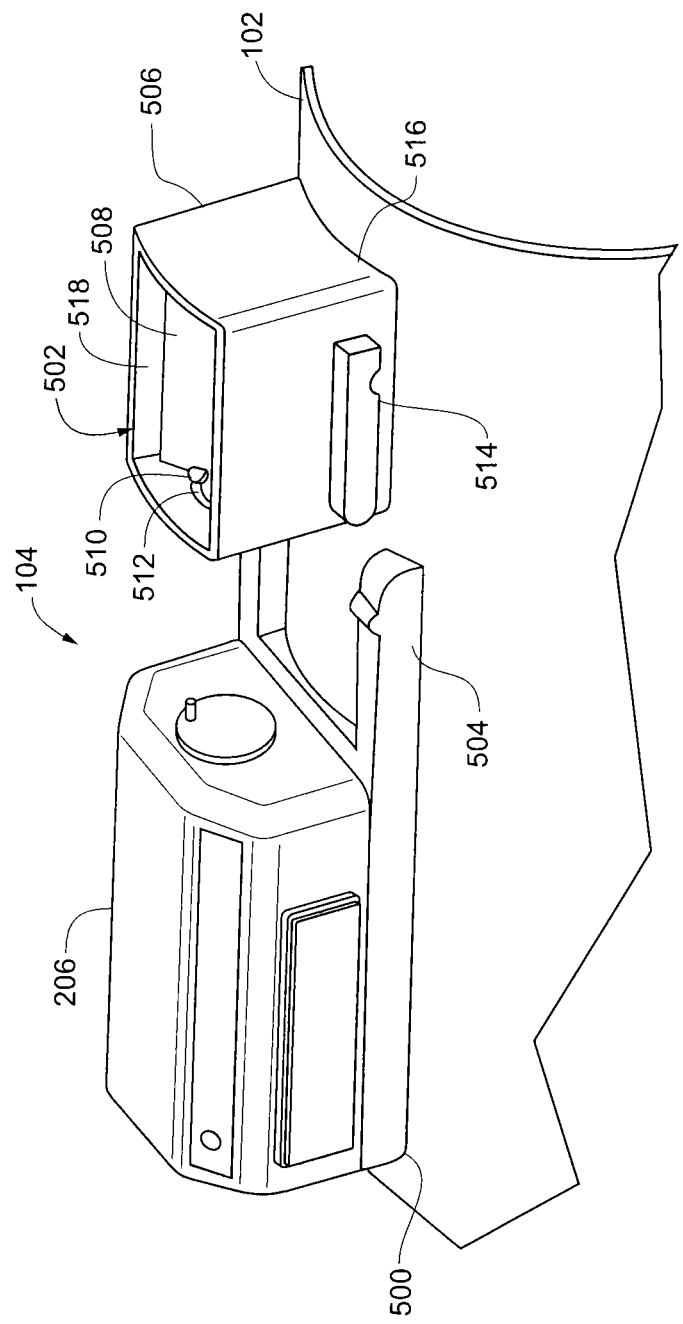
FIG. 10 is a schematic diagram of an automatic gated-pipe actuator according to another embodiment.
Figure 11:
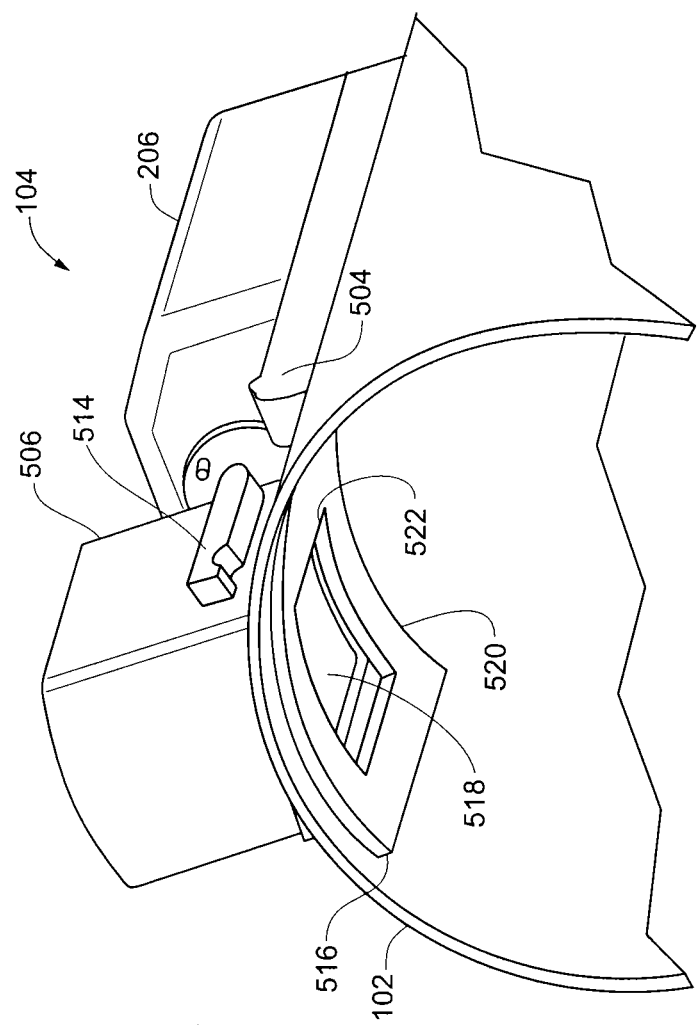
FIG. 11 is a schematic diagram of an automatic gated-pipe actuator according to another embodiment.

In another embodiment depicted in FIGS. 10-11, the AGPA 104 utilizes a gate-lock base plate 500, and a gate-lock gate valve 502 to interface with the gated pipe 102. The gate-lock base plate 500 may interface with the weatherproof case 206 in a releasable configuration thereby allowing the gate-lock base plate 500 and weatherproof case 206 to be removed for servicing and storage. The gate-lock base plate 500 may be partially circular on the edge facing the gated pipe 102 in order to allow the gate-lock base plate 500 to conform to the curvature of the gated pipe 102. Further, the gate-lock base plate 500 may have a gate-lock gate valve interface 504 that allows the gate-lock base plate 500 to interface with the gate-lock gate valve 502 in a releasable configuration thereby allowing additional placing options and maintenance. The gate-lock gate valve 502 may have a gate valve body 506, valve 508, actuator interface 510, actuator interface guide channel 512, a gate-lock base plate interface 514, a gated pipe interface 516 and a gate-lock gate port 518. The valve 508 may be a butterfly valve or a tilting valve and may be affixed to the actuator interface 510 and operably connected to the gate valve body 506. The gated pipe interface 516 may have a flange 520 and gated pipe interface channel 522 that interfaces with the interior of a gate in the gated pipe thus securing the gate-lock gate valve 502 to the gated pipe. Further, the gate-lock base plate interface 514 may interface with the gate-lock gate valve interface 504 in a releasable configuration in order to secure the AGPA 104 to the gated pipe 102. In this embodiment, the actuator interface 510 interfaces with the gate actuator 202 in a releasable configuration. Further, the gate actuator 202 will rotate and thus move the actuator interface 508 through the actuator interface guide channel 510 which, in turn, opens and closes the valve 506. The gate-lock gate port 518 provides for the flow of irrigation material 108 through the gate-lock gate valve 502 when the valve 506 is in an open position.

Figure 12:
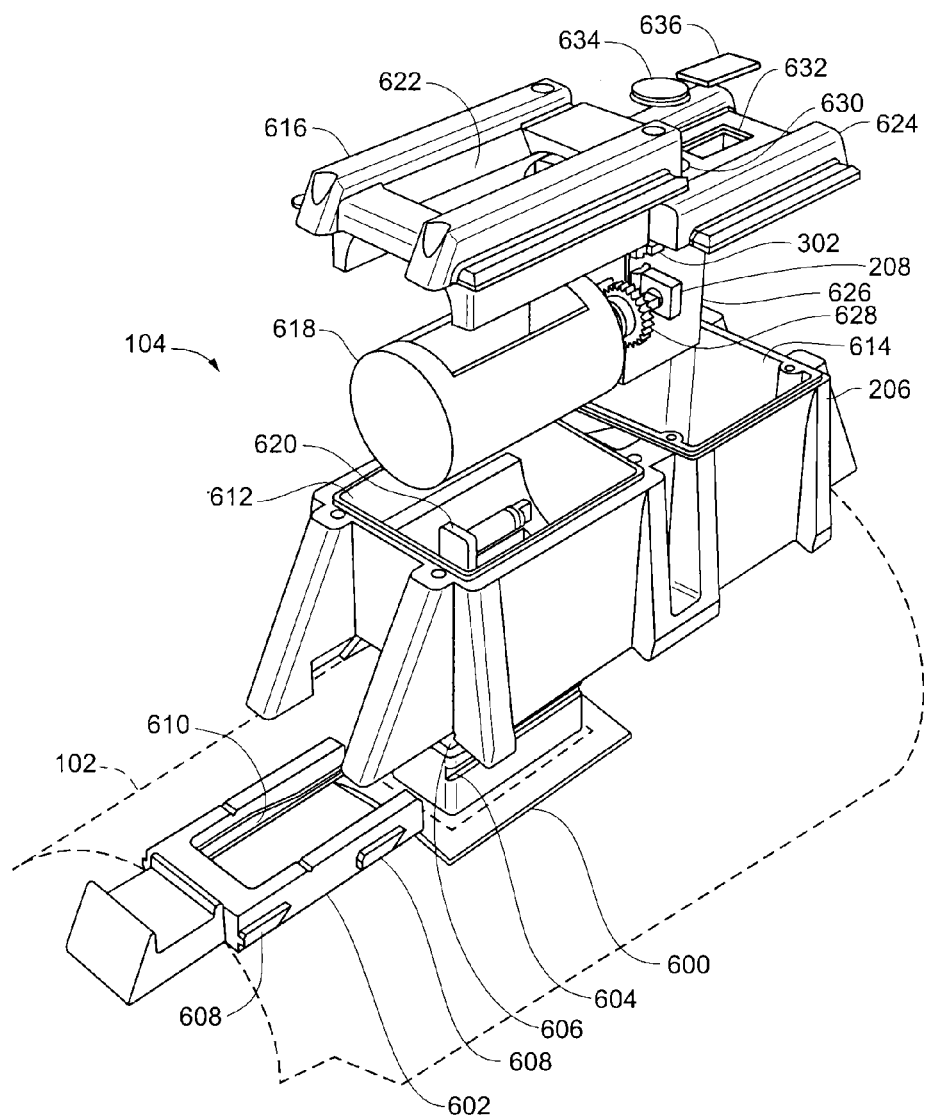
FIG. 12 is a schematic diagram of an automatic gated-pipe actuator according to another embodiment.
Figure 13:
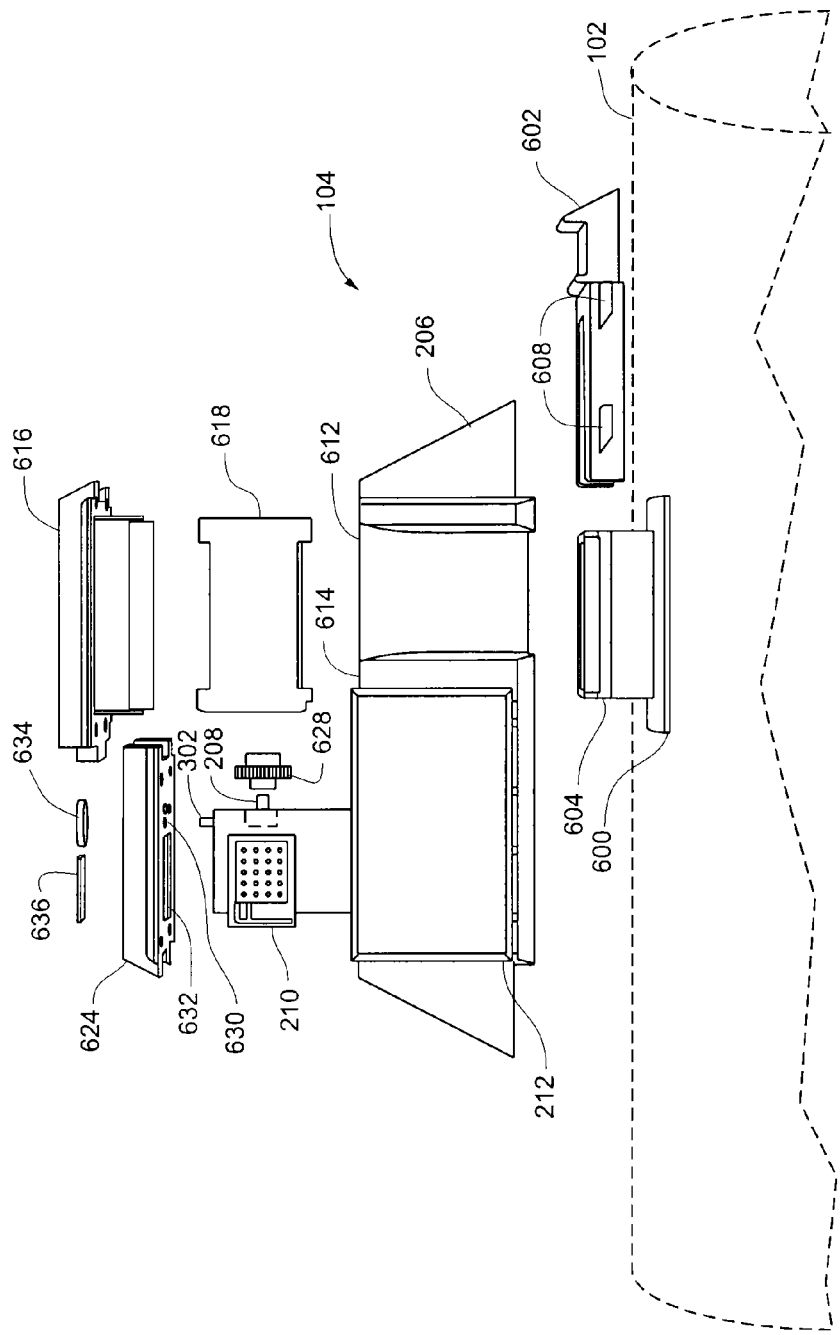
FIG. 13 is a schematic diagram of an automatic gated-pipe actuator according to another embodiment.

In another embodiment depicted in FIGS. 12-13 the AGPA 104 utilizes a gate mount 600, and a gate mount interface sleeve 602 to interface with the gated pipe 102. The gate mount 600 may have gate mount interface sleeve channels 604 and a gate port 606. The gate mount interface sleeve 602 may have weatherproof case interfaces 608 and gate mount interface sleeve channels 610. In this embodiment, the gate mount 600 interfaces with a gated pipe 102 gate by passing through the gated pipe 102 gate opening. The gate mount interface sleeve 602 then interfaces with the gate mount 600 utilizing gate mount sleeve channels 606 that interface with gate mount interface sleeve channels 604 of the gate mount 600 thereby securing the gate mount 600 and gate mount interface sleeve 602 to the gated pipe 102 in a releasable configuration. The gate mount interface sleeve 602 may then interface with the weatherproof case 206 utilizing the weatherproof case interfaces 608, which releasably secure the weatherproof case 206 to the gate mount interface sleeve 602, gate mount 600 and the gated pipe 102. The weatherproof case 206 has a weatherproof valve compartment 612 and a weatherproof control compartment 614 and a power charging unit 212. The weatherproof valve compartment 612 may have a valve compartment top 616 and may house a cartridge valve 618, and gate actuator 620. The valve compartment top 616 may have a flow port 622 for allowing irrigation material 108 to flow when the cartridge valve 618 is in an open position. The weatherproof control compartment 614 may have control compartment top 624 and may house a control circuit board 626 and motor gear 628. The control compartment top 624 may have an override switch port 630 and a LCD readout port 632 that may interface with a switch port cap 634 and LCD readout panel 636. The control circuit board 626 may have a motor 208, power storage unit 210, timer and controller 300 (not shown) and manual override switch 302. The manual override switch 302 may be operably coupled to the switch port cap 634 and the control circuit board 626 may be operably connected with the LCD readout panel 636.

In this embodiment, the gate actuator 618 may be operably coupled to the cartridge valve 618 and the motor gear 628. The motor gear 628 may then be operably coupled to the motor 208. Thus, the timer and controller 300 may provide operating instructions to the motor 208 thereby actuating the motor gear 628, gate actuator 620 and the cartridge valve 618. This actuation may alter the position of the cartridge valve 618 to an open position, thus allowing irrigation material 108 to flow from the gated pipe 102 through the gate port 606 or it may position the cartridge valve 618 in a closed position, thus blocking the flow of irrigation material. Further, the timer and controller 300 may provide status and programming updates for display on the LCD readout panel 636. In addition, the switch port cap 634 may be depressed, thus triggering the manual override switch 302 and instructing the timer and controller 300 to provide instructions to the motor 208, thus altering the configuration of the cartridge valve 618.

Figure 14:
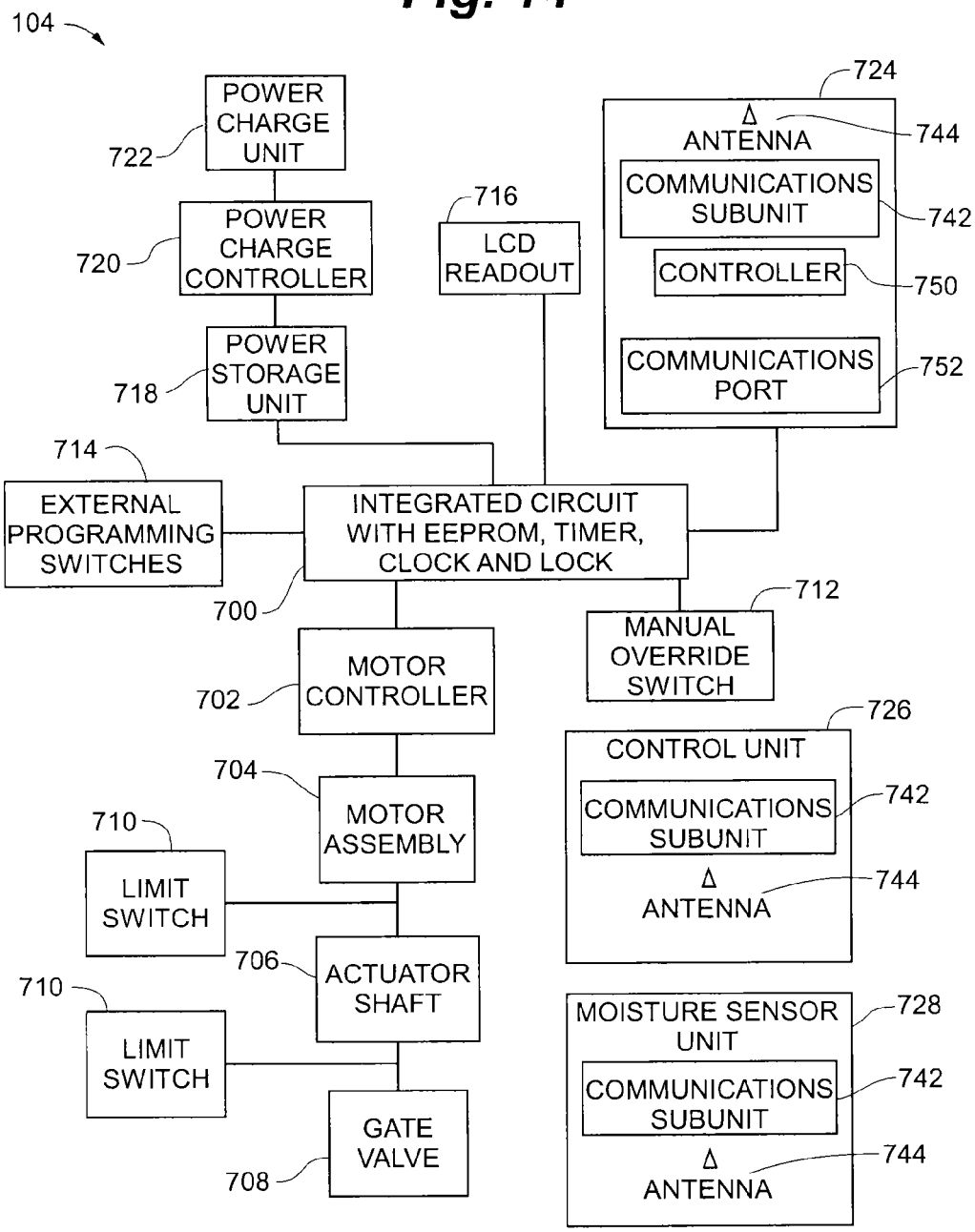
FIG. 14 is a schematic diagram of an automatic gated-pipe actuator according to another embodiment.

FIG. 14 depicts an AGPA 104 according to one embodiment of the present invention. The AGPA 104 may have a processor unit 700, motor controller 702, motor assembly 704, actuator shaft 706, gate valve 708, one or more limit switches 710, a manual override switch 712, one or more external programming switches 714, an LCD readout 716, a power storage unit 718, a power charge controller 720, a power charging unit 722, a communications assembly 724 a external control unit 726 and a moisture sensor unit 728.

The processor unit 700 may have an integrated circuit 730 (not shown), memory 732 (not shown), timer chip 734 (not shown), and real-time clock 736 (not shown). In various embodiments the integrated circuit may be a microprocessor, microcontroller or field programmable gate array (FPGA) or any other processor capable of executing instructions stored in a memory. The memory 732 may be volatile memory or non-volatile memory such as Read Only Memory (ROM), Programmable Read Only Memory (PROM), Erasable Read Only Memory (EPROM), Electrically Erasable Read Only Memory (EEPROM) or any suitable medium for storing data and program instructions for operation even in the event of power loss.

The motor assembly 704 may have a motor 738 (not shown) and gearbox 740 (not shown). The motor may be a DC motor or other motor capable of generating force in at least one direction. The gearbox 740 may contain several gears that enable the motor to interface with the actuator shaft 706 and thereby transfer the force generated by the motor 738 in an efficient manner. In some embodiments, the gearbox 740 allows for the use of a smaller, more energy efficient motor 738.

The external control unit 726 may have a communications subunit 742, an antenna 744 and a control interface 746 (not shown). Further, the external control 726 unit may be a Personal Data Assistant (PDA), laptop computer, desktop computer, smartphone, communications server or other device capable of sending and receiving a controlling signal or other data communication, wired or wirelessly to the AGPA 104. The communications subunit 742 may utilize various wired and wireless communication protocols such as 802.3, 802.3ab/ah, 802.11a/b/g/n, Bluetooth, coded orthogonal frequency-division multiplexing (COFDM), Media Transfer Protocol (MTP) or other protocols capable of supporting communication over a wired or wireless interface. Further, the communications subunit 738 may have a unique identifier such as a Media Access Control address (MAC) in order to allow for identification.

The moisture sensor unit 728 may have a moisture sensor 748 (not shown) communication subunit 742 and an antenna 744. The moisture sensor 748 may be an AquaPro, Davis Instruments, Gardena or other moisture sensor capable of detecting moisture in the soil. The communications subunit 742 may utilize various wired and wireless communication protocols such as 802.3, 802.3ab/ah, 802.11a/b/g/n, Bluetooth, coded orthogonal frequency-division multiplexing (COFDM), Media Transfer Protocol (MTP) or other protocols capable of supporting communication over a wired or wireless interface. Further, the communications subunit 742 may have a unique identifier such as a Media Access Control address (MAC) in order to allow for identification.

The communications assembly 724 may have a communications subunit 742 an antenna 744, controller 750 and a communications port 752. The communications subunit 742 may utilize various wired and wireless communication protocols such as 802.3, 802.3ab/ah, 802.11a/b/g/n, Bluetooth, coded orthogonal frequency-division multiplexing (COFDM), Media Transfer Protocol (MTP) or other protocols capable of supporting communication over a wired or wireless interface. Further, the communications subunit 738 may have a unique identifier such as a Media Access Control address (MAC) in order to allow for identification. The communications port 752 may be a USB 1.0/2.0/3.0 port, a memory card slot such as Secure Digital (SD) or Compact Flash (CF), a serial port or other port type capable of sending and receiving control signals or other data communications.

A person having skill in the art will recognize that the various components of the AGPA 104 depicted in FIG. 14 may be implemented in any of the AGPA 104 embodiments depicted in FIGS. 2-13 described above without deviating from the scope and intent of the invention.

In various embodiments, the processor unit 700, power storage unit 718, power charge controller 720, motor controller 702, motor assembly 704, LCD readout 716, external programming switches, manual override switch 712 and communications assembly 724 are housed within the weather resistant case 206. In other embodiments, the various aforementioned components may be housed within additional weather resistant 206 cases or alternate weather resistant compartments of the same weather resistant case 206 while being operably coupled to ensure normal function. Further, a person having skill in the art will recognize that the processor unit 700, power storage unit 718, power charge controller 720, power charge unit 722, motor controller 702, motor assembly 704, LCD readout 716, external programming switches, manual override switch 712, communications assembly 724 may be described as an automatic gated pipe gate control unit that controls the function of the AGPA 104.

In some embodiments, the processor unit 700 acts as the main controller of the AGPA 104. The processor unit 700 may execute program logic stored in the memory 732 and utilize the timer chip 734 and real-time clock 736 to help determine operational function. In one embodiment, the processor unit 700 utilizes the real-time clock 736 and timer chip 734 to determine when to instruct the motor controller to instruct the motor assembly to cycle, thereby actuating the actuator shaft and either opening, or closing the gate valve. In various embodiments, the processor unit 700 may provide a cycle time to the motor controller thereby limiting the actuation of the actuator shaft. However, in some embodiments, the limit switches 710 act to limit the actuation of the actuator shaft in either the open or closed position. Thus, the cycle time provided by the processor unit may be used as a failsafe backup in the event that one or more of the limit switches 710 malfunctions.

In some embodiments, the processor unit 700 provides menu navigation, diagnostic, control and programming information via the LCD readout 716. Thus, a user may utilize the LCD readout 716 to obtain instantaneous information about the status and function of the AGPA 104. In related embodiments, a user may utilize the external programming switches 714 to alter the programming logic stored in the processor unit 700 and have updated information displayed on the LCD readout 716. If the user wanted to alter the cycle time of the motor 738, the user may utilize the external programming switches 714 and the LCD readout 716 to navigate through menu navigation to the processor unit's 700 programming logic that determines cycle time. This may show on the LCD readout 716 as, for example, "CYCLE TIME [60]". The user may then utilize the external programming switches 716 to alter the cycle time to an alternate value, thereby altering the programming logic in the processor unit 700. A person having skill in the art will recognize that the processor unit 700 may contain other program logic with configuration values that may be altered, thus altering function of the AGPA 104. In some embodiments, the processor unit may allow the user to alter the cycle duration (length of cycle in milliseconds), number of motor cycles (number of cycles per 24 hour period), time between motor cycles (timeout between cycles in milliseconds), independent motor selection and cycle (control of more than one motor controller), power storage unit error timeout (shutdown AGPA 104 in event of power supply error), LCD readout brightness, communications subunit protocol (switch between, for example, Bluetooth and 802.11a/b/g/n), communications port enabled (enable communications port read/write), moisture sensor unit enabled, control unit enabled (enable external control), number of gate valves (alter motor controller signals) or other configuration variables that may alter the function of the AGPA 104.

In some embodiments, the user may update the programming logic of the processor unit 700 via the communications port 752 of the communication assembly 724. The communications port may be a USB port, and the user may update the programming logic by inserting a USB key and selecting, for example, "import program" from the LCD readout's menu navigation or by depressing both external programming switches 714 for a certain period of time. In a related embodiment, the processor unit 700 may be reset in the event of an error. The user may depress the external programming switches 714 and manual override switch 712 for a certain period of time, thereby cycling the power of the AGPA 104 and reinitializing the program logic of the processor unit 700.

In another embodiment, the user may alter the function of the AGPA 104 by using the manual override switch 712. The manual override switch 712 is capable of interrupting the program logic executed by the processor unit 700. Thus, if the gate valve 708 is in an open position due to the recent cycling of the motor 738, by depressing the manual override switch 712 the user can interrupt the cycle and close the gate valve 708. Similarly, if the gate valve 708 is in a closed position, depressing the manual override switch 712 will cycle the motor 738 and open the gate valve 708.

In various embodiments, the processor unit 700 obtains operating power from the power storage unit 718. The power storage unit 718 may be a rechargeable battery such as lead acid, nickel cadmium (NiCd), nickel metal hydride (NiMH), lithium ion (Li-ion), lithium ion polymer (Li-ion polymer), or other similar rechargeable battery. Similarly, the power storage unit 718 may be a capacitor such as a multilayer ceramic, ceramic disc, multilayer polyester film, tubular ceramic, polystyrene, metalized polyester film, aluminum electrolytic capacitor. Other embodiments utilize a capacitor-battery combination in order to ensure operating power reaches the processor unit 700. The power storage unit 718 may be charged by the power charging unit 722 which is controlled by the power charge controller 720. The power charging unit 722 may be a Solar photovoltaic (PV) which may be made out of a excitable material such as amorphous silicon, polycrystalline silicon, microcrystalline silicon, cadmium telluride, and copper indium selenide/sulfide or the like. The power charging unit 722 may also be an external battery pack, small wind turbine, or water turbine capable of providing enough energy to charge the power storage unit 718. The power charge controller 720 ensures that the power charge unit 722 is providing sufficient charge to the power storage unit 718 and also ensures that the power storage unit is not overcharged. In this way, the power charge controller 720 acts to ensure that the power storage unit 718 maintains its capacity over a long period of time, thus reducing the cost of maintenance.

The moisture sensor unit 724 may be used to communicate with the processor unit 700 and override the program logic. For example, the moisture sensor unit may 724 may be placed in the soil near the AGPA 104. The moisture sensor unit 724 may utilize the moisture sensor 748 to detect the amount of moisture in the soil. Depending on the level of moisture, the moisture sensor unit 724 may utilize the communications subunit 742 and antenna 744 to communicate with the communications assembly 724 connected to the processor unit 700. In this way, the moisture sensor unit 728 may override the program logic of the processor unit 700 when there is either too much moisture (close gate valve 708) or too little moisture (open gate valve 708). A person having skill in the art will recognize that in various other embodiments, a temperature sensor, humidity sensor, plant leaf moisture content sensor, water flow rate sensor, gate obstruction sensor, gate malfunction sensor or other such sensor may be utilized to communicate with the processor unit 700 and override the program logic.

In various embodiments, the external control unit 726 is capable of altering the programming logic or configuration of the processor unit 700 remotely. In one embodiment, a user may walk through the field utilizing a hand-held external control unit 726 such as a laptop, PDA, or smartphone. The user may utilize the control interface 746 to alter program logic or configuration files capable of interpretation and execution by the processor unit 700 of the AGPA 104. The user may then transmit the program logic or configuration over the communications subunit 742 to the communications assembly 724 of the AGPA 104. The communications assembly 724 may then provide the received program logic or configuration date to the processor unit 700 which will override the existing program logic or configuration stored in the memory 732.

In another embodiment, the external control unit 726 is a remote personal computer, laptop, PDA, or smartphone that utilizes a modified earth mapping tool, such as Google Earth™, as the control interface 746. The modified earth mapping tool enables the user to setup the Global Positioning Service (GPS) coordinates and MAC address of each AGPA 104 unit. Further, the modified earth mapping tool may have additional functionality allowing the updating of existing AGPA 104 program logic or configuration. Thus, the user may utilize the modified earth mapping tool to virtually navigate through their fields and target individual AGPA 104 units for program logic and configuration updates. The control interface 746 would send a signal to the selected AGPA 104 utilizing the communication subunit 742 and antenna 744. The antenna 744 may be a long-range, high-strength antenna allowing the external control unit 726 to communicate over long distances without signal corruption or dropout. Further, in these embodiments, the antenna 744 may utilize a repeater or range extender in order to cover more area and ensure communication with AGPA 104 communication assemblies 724.

Figure 15:
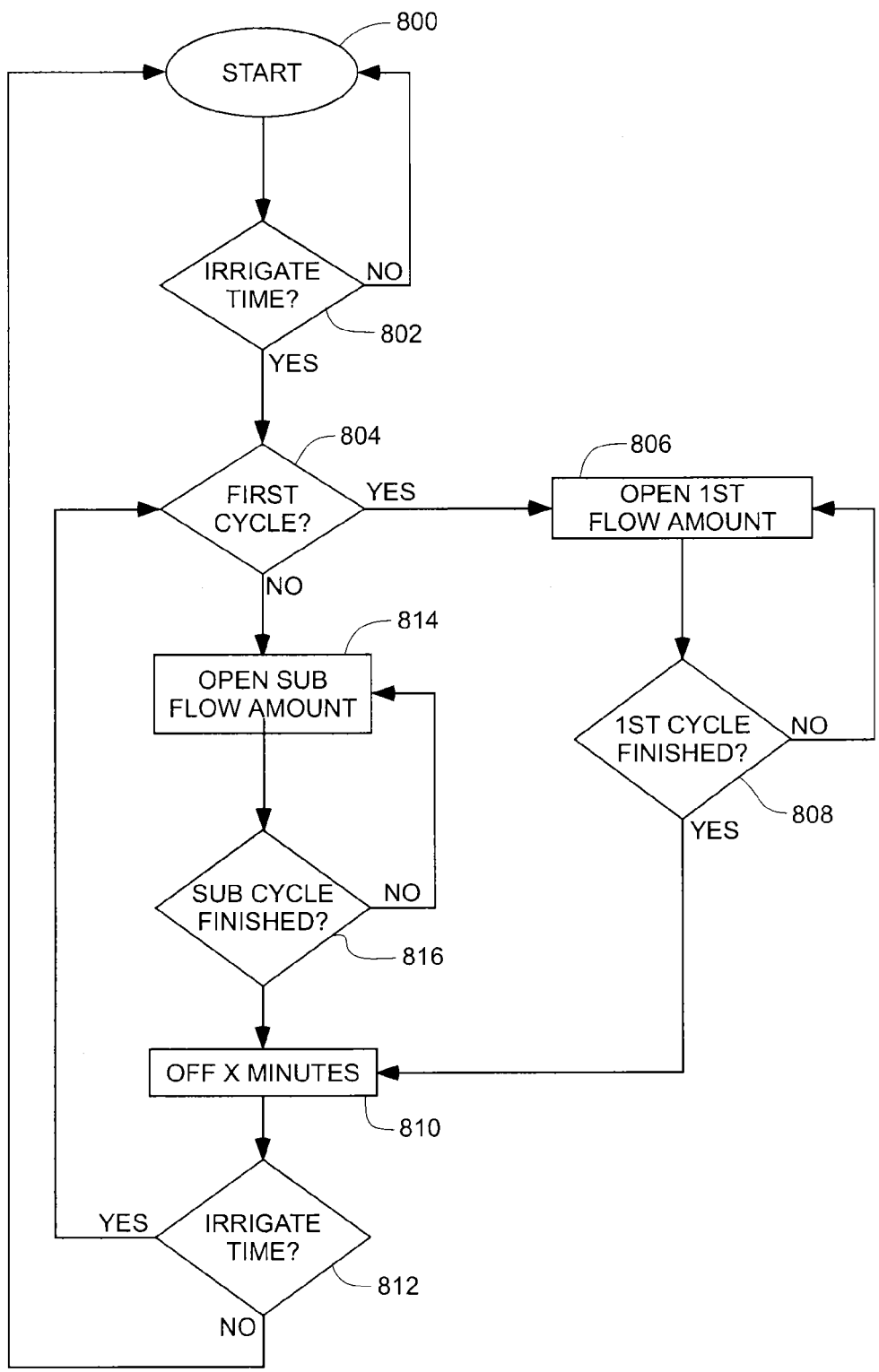
FIG. 15 is a flowchart depicting gate control instructions according to one embodiment.

Referring to FIG. 15, the operation of the AGPA 104 according to one embodiment, is depicted. In process step 800, the processor unit 700 is awakened by the real-time clock 736 to determine irrigation status. In process step 802 the processor unit 700 will check whether irrigation time has been reached. If no, the processor unit will return to process step 800 and sleep until awoken. If it is time to irrigate, the processor unit 700 will determine whether it is performing a first irrigation cycle in process step 804. If yes, the processor unit 700 will instruct the motor controller 702 to open to a first flow amount in process step 806.

In various embodiments, the motor controller 702 polarity is set by the processor unit 700 program logic to turn on the motor 738 of the motor assembly 704 in a forward or reverse rotation. The motor 738 will actuate the actuator shaft 706 and open the gate valve 708. In certain embodiments, the actuator shaft 706 may move in a linear push-pull motion or rotate depending on the implementation of the motor assembly 704 and actuator shaft 706 as depicted, for example, in FIGS. 2-13.

At process step 808 the processor unit 700 will determine whether the first irrigation cycle is complete. If not, the processor unit will return to step 806. If the first irrigation cycle is complete, the processor unit 700 will cause the AGPA 104 to sleep for a specific number of minutes, as instructed in process step 810.

In process step 812 the processor unit 700 will determine irrigation status. If it is time irrigate, the processor unit 700 will return to process step 804 and determine whether it is performing a first irrigation cycle. If not performing a first irrigation cycle, the processing unit 700 will instruct the motor controller 702 to open to a second flow amount of a sub-irrigation cycle in process step 814.

At process step 816 the processor unit 700 will determine whether the sub irrigation cycle is complete. If not, the processor unit will return to step 814. If the sub irrigation cycle is complete, the processor unit 700 will cause the AGPA 104 to sleep for a specific number of minutes, as instructed in process step 810.

A person having skill in the art will recognize that the embodiment described above is just one embodiment to a program logic stored in a processor unit 700. Further, one having skill in the art will recognize that the processor unit 700 may utilize the timer 734 and real-time clock 736 to determine time periods for first- and sub-flow amounts, to determine when irrigation cycles are finished and to determine how long a device is to sleep. Thus, while FIG. 14 depicts one embodiment of the operation of an AGPA 104 several variations are enabled by the present disclosure.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 212, sixth paragraph of 35 U.S.C. are not to be invoked unless the specific terms "means for" or "step for" are recited in a claim.

What is claimed is:

1. An automatic gated-pipe actuator for controlling flow of an irrigation material to an agricultural region through an irrigation gate in a gated-irrigation pipe, the automatic gated-pipe actuator comprising:
    a gate valve for coupling to the gated-irrigation pipe;
    a gate actuator removably coupled to the gate valve and for actuating the gate valve; and
    an automatic gated pipe gate control unit for controlling actuation of the gate valve, the control unit having a processor unit proximate to and communicatively coupled with the gate actuator, wherein the gate control unit is programmed with at least one operating instruction for independently and automatically the gate actuator without receiving instruction from a remote source;
    wherein upon instruction from the gate control unit according to the at least one operating instruction, the gate actuator will actuate and alter the disposition of the gate valve, thereby altering the flow of irrigation material through the irrigation gate and to an agricultural region, and wherein the gate control unit is adapted to control the gate valve to alter the disposition of the gate valve between a plurality of different open positions and a closed position, each open position providing for a different flow rate of irrigation material through the irrigation gate.

2. The automatic gated-pipe actuator of claim 1, wherein the actuator further includes a communications assembly communicatively coupled to the processor unit and for receiving additional control information from the remote source remotely altering the first operating instruction to alter operation of the automatic gate-pipe actuator, and wherein upon receiving initial control information from the remote source the actuator will actuate the gate valve for a plurality of irrigation cycles regardless of whether further control information is communicated to the actuator.

3. The automatic gated-pipe actuator of claim 2, wherein the remote source is a sensor selected from the group consisting of a soil moisture sensor, temperature sensor, humidity sensor, plant leaf moisture content sensor, water flow rate sensor, gate obstruction sensor, and a gate malfunction sensor.

4. The automatic gated-pipe actuator of claim 2, wherein the remote source is a remote control unit selected form the group consisting of a Personal Data Assistant (PDA), laptop computer, desktop computer, smartphone, or a communications server.

5. The automatic gated-pipe actuator of claim 1 wherein the gate actuator comprises a gate rod capable of controlling one or more gate valves.

6. The automatic gated-pipe actuator of claim 1 wherein the automatic gated pipe gate control unit further comprises:
    a power storage unit operably coupled to the processor unit;
    a power charging unit operably coupled to the processor unit;
    a manual override switch operably coupled to the processor unit;

a program switch operably coupled to the processor unit;
a communications port operably coupled to the processor unit;
a motor controller operably coupled to the processor unit; and
a motor assembly operably coupled the motor controller and the gate actuator comprising
a motor wherein the motor controller is adapted to instruct the motor assembly to actuate in response to a set of instructions from the processor unit.

7. The automatic gated-pipe actuator of claim 1 wherein the processor unit comprises:
a microprocessor controller;
a memory operably coupled the microprocessor controller;
a timer module operably coupled the microprocessor controller; and
a real-time clock operably coupled the microprocessor controller.

8. The automatic gated-pipe actuator of claim 2, wherein the communications assembly includes a communications port that accepts input from an input source selected from the group consisting of pushbutton switches, rotary switches, wireless antenna, handheld programming device, digital memory device, a USB memory stick and a memory card.

9. The automatic gated-pipe actuator of claim 6 wherein the power storage unit is selected from the group consisting of a rechargeable battery and a capacitor.

10. The automatic gated-pipe actuator of claim 6 wherein the power charging unit is a solar panel.

11. The automatic gated-pipe actuator of claim 1 wherein the gate valve has a screw affixed thereupon and wherein the gate actuator is a screw actuator shaft operably coupled to the screw whereby the screw actuator shaft will rotate thereby opening or closing the gate valve.

12. The automatic gated-pipe actuator of claim 1, wherein the plurality of different open positions and the closed position provide for continuous adjustment of between 0% and 100% of the maximum flow capacity of the irrigation gate.

13. The automatic gated-pipe actuator of claim 1, further comprising:
a gate mount connected to the gated-irrigation pipe adjacent the irrigation gate;
a gate mount interface sleeve releasably attached to the gate mount; and
a weatherproof case releasably secured to the gate mount interface sleeve, gate mount and irrigation gate, the weatherproof case providing a weather tight seal around the gate valve and gate actuator.

14. A system for automatic irrigation having localized and independent irrigation control comprising:
a gated pipe connected to a source of irrigation material for irrigating an agricultural region, the gated pipe including a plurality of irrigation gates for allowing the irrigation material to flow therethrough to the agricultural region; and
a plurality of individually controllable automatic gated-pipe actuators operably coupled to the plurality of irrigation gates, each of the one or more automatic gated-pipe actuators including:
a gate valve operably coupled to the gated pipe about one of the plurality of irrigation gates;
a gate actuator removably coupled to the gate valve and for actuating the gate valve; and
an automatic gated pipe gate control unit for controlling actuation of the gate valve, the control unit having a processor unit proximate to and communicatively coupled with the gate actuator, wherein each gate control unit is programmed with at least one operating instruction for independently and automatically the gate actuator without receiving instruction from a remote source;
wherein upon instruction from the gate control unit according to the at least one operating instruction, the gate actuator will actuate and alter the disposition of the gate valve thereby altering the flow of the irrigation material through the one of the plurality of irrigation gates and to a portion of the agricultural region adjacent the irrigation gate and wherein the gate control unit is adapted to control the gate actuator to alter the disposition of the gate valve between a plurality of different open positions and a closed position, each open position providing for a different flow rate of irrigation material through the irrigation gate;
and wherein the actuation of the plurality of irrigation gates controls an overall flow of irrigation material to the agricultural region.

15. The system of claim 14, wherein at least one of the plurality of automatic gate-pipe actuators further includes a communications assembly communicatively coupled to the processor unit and for receiving additional control information from the remote source remotely altering the first operating instruction to alter operation of the automatic gate-pipe actuator and wherein upon receiving initial control information from the remote source the at least one actuator will actuate the corresponding gate valve for a plurality of irrigation cycles regardless of whether further control information is communicated to the actuator.

16. The system of claim 15, wherein the remote source is a sensor selected from the group consisting of a soil moisture sensor, temperature sensor, humidity sensor, plant leaf moisture content sensor, water flow rate sensor, gate obstruction sensor, and a gate malfunction sensor.

17. The system of claim 15, wherein the remote source is a remote control unit selected form the group consisting of a Personal Data Assistant (PDA), laptop computer, desktop computer, smartphone, or a communications server.

18. The system of claim 14, wherein the automatic gated pipe gate control unit further comprises:
a power storage unit operably coupled to the processor unit;
a power charging unit operably coupled to the processor unit;
a manual override switch operably coupled to the processor unit;
a program switch operably coupled to the processor unit;
a communications port operably coupled to the processor unit;
a motor controller operably coupled to the processor unit; and
a motor assembly operably coupled the motor controller and the gate actuator comprising
a motor wherein the motor controller is adapted to instruct the motor assembly to actuate in response to a set of instructions from the processor unit.

19. The system of claim 14, wherein the processor unit further comprises:
a microprocessor controller;
a memory operably coupled the microprocessor controller;
a timer module operably coupled the microprocessor controller; and
a real-time clock operably coupled the microprocessor controller.

20. The system of claim 14, wherein the plurality of different open positions and the closed position provide for continuous adjustment of between 0% and 100% of the maximum flow capacity of the irrigation gate.

21. The system of claim 14, further comprising:
   at least one gate mount connected to the gated pipe adjacent a corresponding irrigation gate;
   a gate mount interface sleeve releasably attached to the gate mount; and
   a weatherproof case releasably secured to the gate mount interface sleeve, gate mount and irrigation gate, the weatherproof case providing a weather tight seal around the gate valve and gate actuator.

* * * * *